(12) United States Patent
Perez-Ramirez et al.

(10) Patent No.: US 11,115,864 B2
(45) Date of Patent: Sep. 7, 2021

(54) LOW POWER RADAR DETECTION SYSTEM

(71) Applicant: Apple Inc., Cupertino, CA (US)

(72) Inventors: Javier Perez-Ramirez, Beaverton, OR (US); Minyoung Park, Portland, OR (US); Richard D. Roberts, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 962 days.

(21) Appl. No.: 15/198,527

(22) Filed: Jun. 30, 2016

(65) Prior Publication Data
US 2018/0003797 A1 Jan. 4, 2018

(51) Int. Cl.
| | |
|---|---|
| *H04W 72/04* | (2009.01) |
| *H04W 72/08* | (2009.01) |
| *H04W 28/08* | (2009.01) |
| *H04W 48/16* | (2009.01) |
| *H04L 12/26* | (2006.01) |
| *H04B 1/69* | (2011.01) |

(52) U.S. Cl.
CPC .......... *H04W 28/085* (2013.01); *H04L 43/16* (2013.01); *H04W 48/16* (2013.01); *H04W 72/0453* (2013.01); *H04W 72/082* (2013.01); *H04B 2001/6912* (2013.01); *Y02D 30/70* (2020.08)

(58) Field of Classification Search
CPC ............... H04W 28/085; H04W 48/16; H04W 72/0453; H04W 72/082; H04L 43/16; Y02D 30/70; H04B 2001/6912
See application file for complete search history.

(56) References Cited

U.S. PATENT DOCUMENTS

| | | | |
|---|---|---|---|
| 9,635,649 B1* | 4/2017 | Amiri | ................... H04W 16/14 |
| 2006/0187114 A1* | 8/2006 | Gibson et al. | ........... G01S 7/28 |
| | | | 342/195 |
| 2007/0081611 A1 | 4/2007 | Fudge et al. | |
| 2009/0160696 A1 | 6/2009 | Pare et al. | |
| 2010/0173586 A1* | 7/2010 | McHenry | ............ H04L 27/0006 |
| | | | 455/62 |

(Continued)

FOREIGN PATENT DOCUMENTS

GB        2431307 A      4/2007

OTHER PUBLICATIONS

Search Report dated Nov. 3, 2017 for European Patent Application No. 17175591.1.

*Primary Examiner* — Erin F Heard
*Assistant Examiner* — Donald H B Braswell
(74) *Attorney, Agent, or Firm* — Eschweiler & Potashnik, LLC (57) ABSTRACT

A communication device can be configured to detect radar signals within an operating channel. The communication device can include a mixer, filter, scanning and spreading circuit and a radar signal detector. The mixer can be configured to modulate a received communication signal based on an oscillating signal to generate a modulated signal. The filter can have a first bandwidth and be configured to filter the modulated signal. The scanning and spreading circuit can be configured to control the oscillating signal to scan an operating channel having a second bandwidth. The second bandwidth can be greater than the first bandwidth. The radar signal detector can be configured to detect a radar signal within the scanned operating channel.

17 Claims, 8 Drawing Sheets

(56) References Cited

U.S. PATENT DOCUMENTS

2010/0202359 A1* 8/2010 Nallapureddy ......... G01S 7/023
  370/328
2010/0283659 A1* 11/2010 Huggett .................. G01S 7/285
  342/20
2011/0053535 A1 3/2011 Yamagishi
2017/0324434 A1* 11/2017 Utter .................... H04B 1/1036

* cited by examiner

LOW POWER RADAR DETECTION SYSTEM

BACKGROUND

Field

Aspects described herein generally relate to radar signal detection, including radar signal detection to reduce or avoid co-channel interference while reducing power consumption of the communication device.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, radar signal detection can be used to avoid co-channel interference. For example, to avoid and/or reduce co-channel interference, devices can use Dynamic Frequency Selection (DFS) techniques.

To operate in, for example, the Unlicensed National Information Infrastructure (UNII) frequency bands, UNII capable devices detect the presence of radar signals before and/or during transmission. The UNII frequency bands can include, for example, 5.150-5.250 GHz, 5.250-5.350 GHz, 5.350-5.470 GHz, 5.470-5.725 GHz, 5.725-5.825 GHz, and/or 5.850-5.925 GHz. The UNII frequency bands and device specifications are described in the Federal Communication Commission's (FCC) Memorandum and Order FCC 06-96, released Jun. 30, 2006, which is incorporated herein by reference in its entirety.

For compliance in the United States, the Memorandum and Order FCC 06-96 describes UNII DFS compliance procedures, including detection, operational, and response requirements. Further, the Memorandum and Order FCC 06-96 defines various radar signal types, including short pulse radar test waveforms, long pulse radar test waveforms and frequency hopping radar test waveforms. These signals can be characterized by, for example, pulse width (PW), number of pulses, pulse repetition interval (PRI), and chirp bandwidth.

Figure 1A:
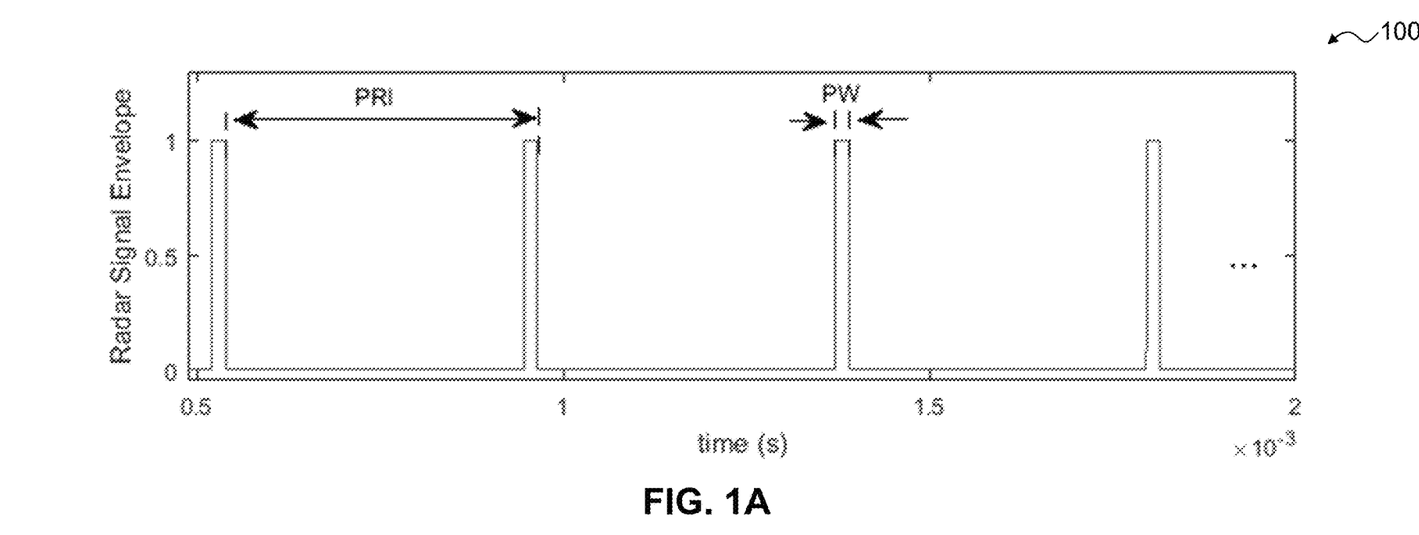
FIGS. 1A and 1B illustrate example waveforms.
Figure 1B:
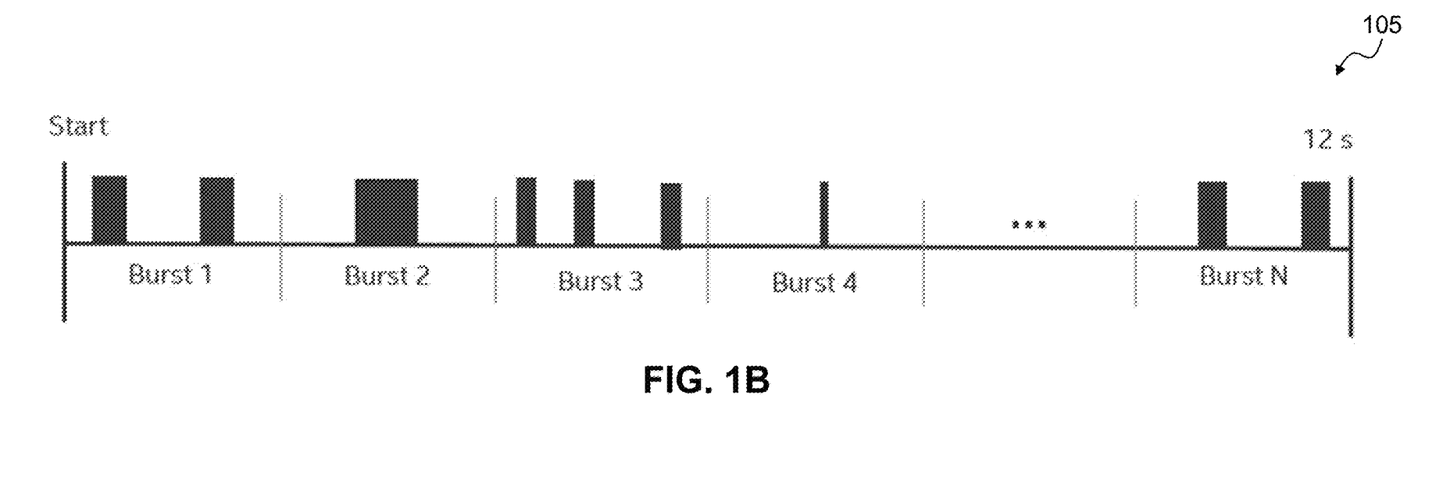

An example short pulse radar test waveform and a long pulse radar test waveform are illustrated in FIGS. 1A and 1B, respectively. For example, FIG. 1A illustrates a short pulse radar test waveform that includes pulses having a constant pulse width PW with a constant pulse repetition interval PRI. In this example, FIG. 1A shows a segment of a short pulse radar test waveform having, for example, a PW of 18 µs and a PRI of 425 µs.

Conversely, FIG. 1B illustrates a long pulse radar test waveform does not have a constant PRI or PW. For example, each of the transmitted pulses is chirped and can have a pulse width of, for example, 50-100 microseconds (µs), which can be similar to a short WiFi data packet.

Figure 2:
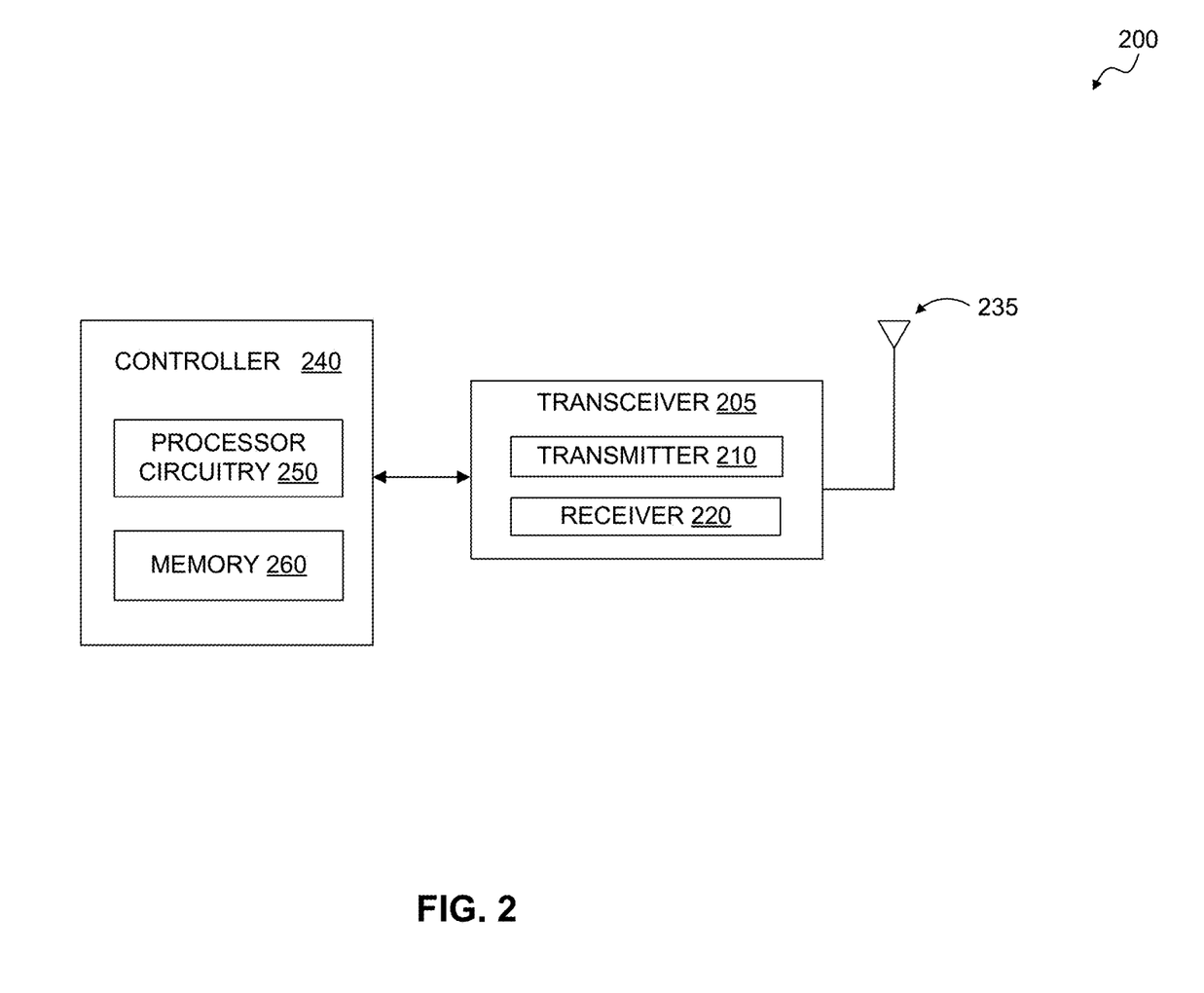
FIG. 2 illustrates a mobile device according to an exemplary aspect of the present disclosure.

FIG. 2 illustrates a mobile device 200 according to an exemplary aspect of the present disclosure. The mobile device 200 is configured to transmit and/or receive wireless communications via one or more wireless technologies. In an exemplary aspect, the mobile device 200 is configured to wirelessly communicate using one or more wireless protocols that can utilize one or more frequencies within the UNII frequency bands. The mobile device 200 can be configured to communicate with one or more other communication devices, including, for example, one or more base stations, one or more access points, one or more other mobile devices, and/or one or more other devices as would be understood by one of ordinary skill in the relevant arts.

The mobile device 200 can include a controller 240 communicatively coupled to one or more transceivers 205. The transceiver(s) 205 can be configured to transmit and/or receive wireless communications via one or more wireless technologies. The transceiver 205 can include processor circuitry that is configured for transmitting and/or receiving wireless communications conforming to one or more wireless protocols. For example, the transceiver 205 can include a transmitter 210 and a receiver 220 configured for transmitting and receiving wireless communications, respectively, via one or more antennas 235.

In exemplary aspects, the transceiver 205 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 235 may include an integer array of antennas, and that the antennas may be capable of both transmitting and receiving wireless communication signals. In aspects having two or more transceivers 205, the two or more transceivers 205 can have their own antenna 235, or can share a common antenna via a duplexer.

The controller 240 can include processor circuitry 250 that is configured to control the overall operation of the mobile device 200, such as the operation of the transceiver(s) 205. The processor circuitry 250 can be configured to control the transmitting and/or receiving of wireless communications via the transceiver(s) 205, and/or perform one or more baseband processing functions (e.g., media access control (MAC), encoding/decoding, modulation/demodulation, data symbol mapping; error correction, etc.). The processor circuitry 250 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 240 can include one or more elements of a protocol stack such as, a physical (PHY) layer, media access control (MAC), radio link control (RLC), packet data convergence protocol (PDCP), and/or radio resource control (RRC) elements.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Examples of the mobile device 200 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 200 may be a stationary communication device, including, for example, a stationary computing device—such as a personal computer (PC), a desktop computer, a computerized kiosk, and an automotive/aeronautical/maritime in-dash computer terminal.

In an exemplary aspect of the present disclosure, the mobile device 200 is configured to wirelessly communicate via one or more wireless protocols, including, one or more Institute of Electrical and Electronics Engineers (IEEE) 802.11 protocols, such as, for example, IEEE 802.11a, 802.11b, 802.11g, 802.11h, 802.11j, 802.11n, and/or 802.11ac. These protocols can generally be referred to as WiFi or WLAN (Wireless Local Area Network).

In an exemplary aspect, the mobile device 200 is configured to wirelessly communicate using one or more frequencies or frequency bands within the Unlicensed National Information Infrastructure (UNII) frequency bands. For example, the mobile device 200 can be configured to wirelessly communicate using one or more of the 5 GHz WiFi frequencies defined in, for example, the IEEE 802.11a, h, j, n, and/or ac protocols, which may be within, for example, the 5.250-5.350 GHz and 5.470-5.725 GHz UNII frequency bands.

In an exemplary aspect, the mobile device 200 is configured to perform one or more radar signal detection operations, such as, for example, Dynamic Frequency Selection (DFS) processing to avoid and/or reduce co-channel interference. The mobile device 200 can be configured to perform the radar signal detection operations before transmitting (i.e., channel availability checking) and/or while transmitting (i.e., in-service monitoring).

Figure 3A:
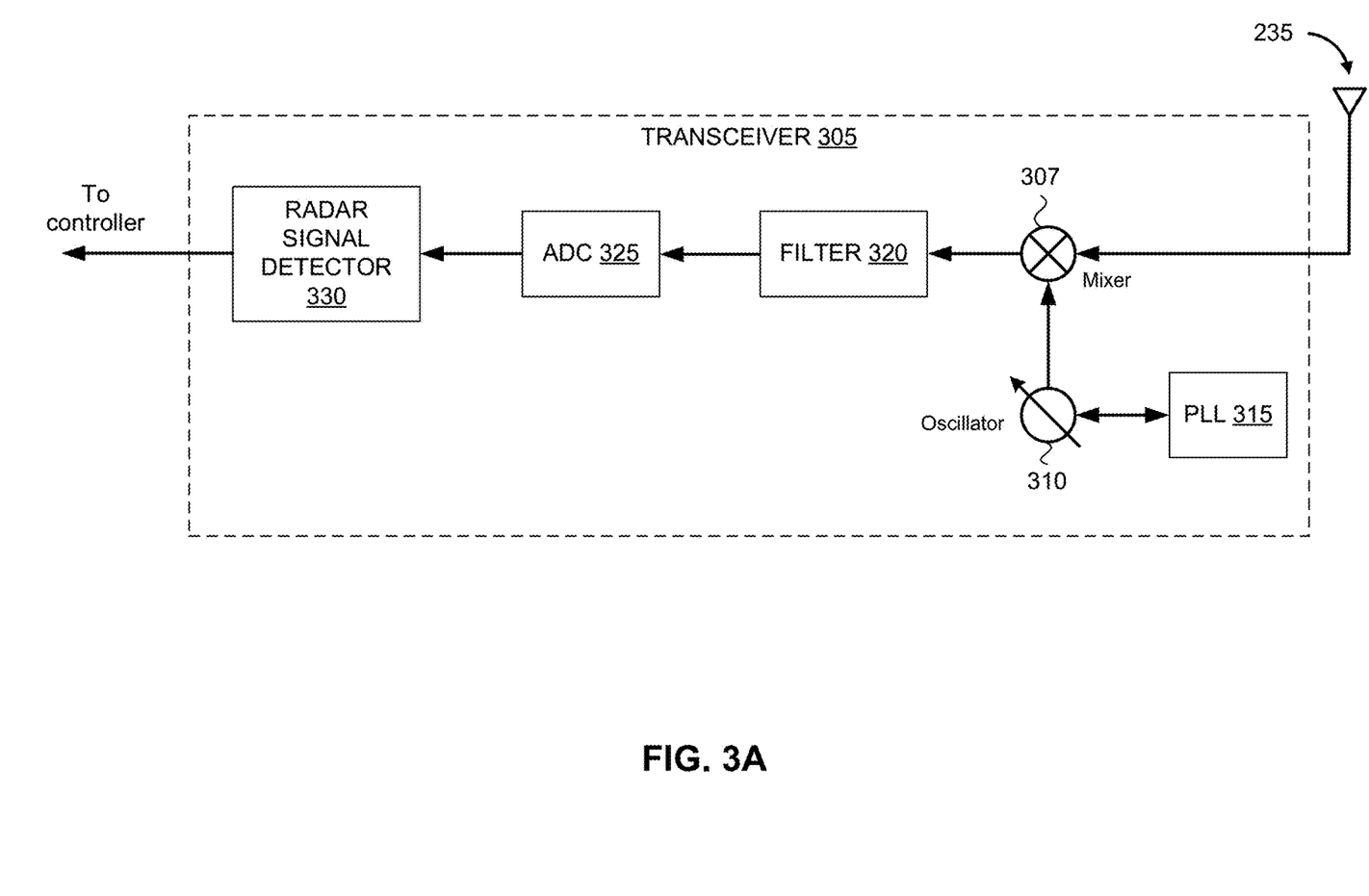
FIG. 3A illustrates a transceiver of the mobile device according to an exemplary aspect of the present disclosure.

FIG. 3A illustrates a transceiver 305 according to an exemplary aspect of the present disclosure. The transceiver 305 can be an exemplary aspect of the transceiver 205 of the mobile device 200. In an exemplary aspect, the transceiver 305 includes a mixer 307, oscillator 310, phase-locked loop (PLL) 315, filter 320, analog-to-digital converter (ADC) 325 and radar signal detector 330.

The mixer 307 can be configured to receive one or more radio frequency (RF) signals via the antenna 235, and to modulate (e.g., down convert) the RF signal(s) based on and one or more oscillating signals from the oscillator 310 to generate one or more corresponding baseband signals. In this example, the mixer is a frequency mixer. The mixer 307 can include processor circuitry configured to generate the output signal (e.g. baseband signals) based on the RF signal and the oscillating signal.

The oscillator 310 can be configured to generate one or more oscillating signals having an oscillation frequency ($f_{LO}$). The oscillating signal can be, for example, a sine wave or square wave, but are not limited thereto. The oscillator 310 can include processor circuitry configured to generate the oscillating signal(s). In some aspects, the oscillator 310 includes a quartz crystal that can be used to control the frequency of the oscillator 310.

In an exemplary aspect, the oscillator 310 is a voltage-controlled oscillator (VCO) whose oscillation frequency is controlled based on a voltage input. In this example, the PLL 315 is configured to generate the voltage input that controls the VCO 310. The PLL 315 can be configured to generate the output voltage signal (i.e., the voltage input signal to the VCO 310) based on an input signal. The input signal can be a feedback signal from the VCO 310 in one or more aspects of the present disclosure. The PLL 315 can be configured to match the phase of the output signal of the PLL 315 with the input signal to the PLL 315. The PLL 315 can include processor circuitry configured generate the output voltage signal (i.e., the voltage input signal to the VCO 310).

In operation, the baseband signal output from the mixer 307 is provided to filter 320. The filter 320 is configured to filter the baseband signal to generate a filtered signal and to provide the filtered signal to the ADC 325. In an exemplary aspect, the filter 320 is a low-pass filter (LPF) but is not limited thereto. In an exemplary aspect, the filter 320 is a LPF having a cutoff frequency of, for example 80 MHz (but is not limited thereto) that is configured to pass signals having a frequency lower than the cutoff frequency (e.g., 80 MHz). In an exemplary aspect, the filter 320 includes processor circuitry configured to generate the filtered signal based on the received input signal (e.g., baseband signal).

The ADC 325 is configured to receive one or more signals and to generate one or more corresponding digital output signals based on the received signal(s). For example, the ADC 325 can be configured to receive an analog signal and to convert the analog signal to a digital signal. In operation, the ADC 325 can receive one or more analog signals (e.g., filtered signal) from the filter 320 and to generate one or more corresponding digital signals. The ADC 325 can provide the digital signal(s) to the radar signal detector 330. In an exemplary aspect, the ADC 325 includes processor circuitry configured to generate one or more digital output signals based on one or more analog input signals.

The radar signal detector 330 is configured to detect one or more radar signals based on corresponding input signals and to provide the radar signal(s) and/or an indication of the presence of the radar signal(s) to the controller 240. The radar signal detector 330 is configured to detect short pulse radar test waveforms based on characteristics of the short pulse radar test waveforms. For example, the radar signal detector 330 is configured to detect short pulse radar test waveforms based on the pulse width (PW), the number of pulses, and/or pulse repetition interval (PRI). In this example, the short pulse radar test waveform can include pulses having a constant PW with a constant pulse repetition interval PRI.

In an exemplary aspect, the radar signal detector 330 is configured to perform one or more envelope detection operations and/or one or more thresholding operations. The envelope detection operation(s) can detect an envelope of an input signal. In an exemplary aspect, an envelope detection operation can include integrating a received input signal (e.g., digital signal from ADC 325). For example, the radar signal detector 330 can be configured to integrate the input signal (e.g., digital signal from ADC 325) of the radar signal detector 320 to perform the envelope detection operation. In an exemplary aspect, an envelope detection operation can include one or more filtering operations. In an exemplary aspect, the thresholding operations include comparing the signal (e.g., the enveloped detected signal) to a threshold value and generating an output signal based on the comparison. For example, the radar signal detector 330 can be configured to compare the envelope detected signal to a threshold value, and to generate an output signal that represents when the envelope detected signal is above or below the threshold value. In an exemplary aspect, the radar signal detector 320 includes processor circuitry configured to perform one or more envelope detection operations and/or one or more thresholding operations. An example radar signal detector according to an exemplary aspect of the present disclosure is discussed in detail below with reference to FIG. 3B.

Figure 3B:
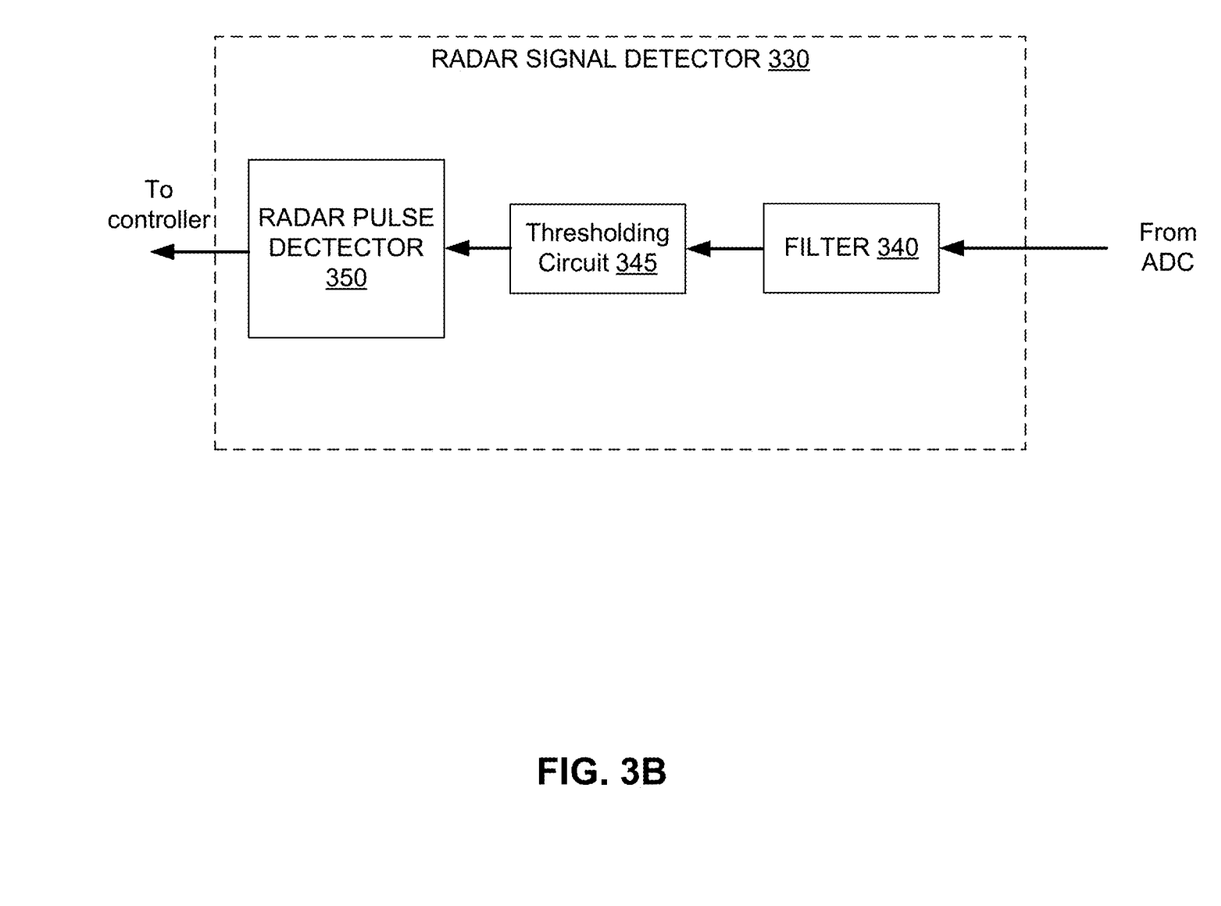
FIG. 3B illustrates a radar signal detector according to an exemplary aspect of the present disclosure.

As illustrated in FIG. 3B, in an exemplary aspect, the radar signal detector 330 includes filter 340, thresholding circuit 345, and radar pulse detector circuit 350.

The filter 340 is configured to filter a received input signal to generate a filtered output signal. For example, the filter 340 can be configured to receive the digital signal from the ADC 325 and to filter the digital signal to generate a filtered signal.

In an exemplary aspect, the filter 340 is a low-pass filter (LPF) but is not limited thereto. In an exemplary aspect, the filter 340 is a LPF having a cutoff frequency of, for example 1 MHz (but is not limited thereto). In an exemplary aspect, the filter 340 is configured to function as an envelope detector and to perform envelope detection operations of the radar signal detector 330. In an exemplary aspect, the filter 340 includes processor circuitry configured to generate the filtered signal based on the received digital signal.

The thresholding circuit 345 is configured to perform one or more thresholding operations. In an exemplary aspect, the thresholding circuit 345 is configured to compare a received signal (e.g., the filtered signal) to a threshold value, and to generate an output signal based on the comparison. For example, thresholding circuit 345 can be configured to compare the envelope detected signal (filtered signal) to a threshold value, and to generate an output signal that represents when the envelope detected signal is above or below the threshold value. In an exemplary aspect, the thresholding circuit 345 includes processor circuitry configured to perform one or more thresholding operations.

The radar pulse detector 350 can be configured to detect one or more short signal pulses. In an exemplary aspect, the radar pulse detector 350 can be configured to detect one or more pulses based on the output signal of the thresholding circuit 345. For example, the radar pulse detector can be configured to process the portions of the envelope detected signal that are above or below the threshold value to detect the presence of one or more signal pulses. The radar pulse detector 350 can also be configured to detect the width of the detected one or more signal pulses. The radar pulse detector 350 can be configured to generate an output signal corresponding to the detected signal pulses and/or signal pulse widths, and to provide the output signal to the controller 240. Based on the output signal, the controller 240 can determine the presence of a radar signal and can control the mobile device 200 to avoid using one or more frequencies or frequency bands within UNIT frequency bands.

In operation, the mobile device 200 including the transceiver 305 can be configured to monitor an 80 MHz operating channel so as to wirelessly communicate using one or more frequencies or frequency bands within UNIT frequency bands. For example, the mobile device 200 can monitor the 80 MHz operating channel for a period of time (e.g., 1 minute) to detect if one or more radar signals are present within the UNIT frequency bands before communicating using one or more frequencies within the UNIT frequency bands. If the mobile device 200 (using the radar signal detector 330) does not detect a radar signal within the period of time, the mobile device 200 can initiate wireless communication using one or more frequencies or frequency bands within the UNIT frequency bands. While wirelessly communicating, the mobile device 200 can continuously or periodically monitor the UNIT frequency bands to avoid co-channel interference so as to comply with the UNIT protocol. For example, while communicating, if the radar signal detector 330 detects a radar signal, the mobile device 200 can stop communicating on frequencies or frequency bands within the UNIT frequency bands. If the mobile device 200 detects a radar signal, the mobile device 200 will stop using one or more frequencies or frequency bands within UNIT frequency bands and/or will not initiate wireless communication using one or more frequencies or frequency bands within UNIT frequency bands.

Figure 4:
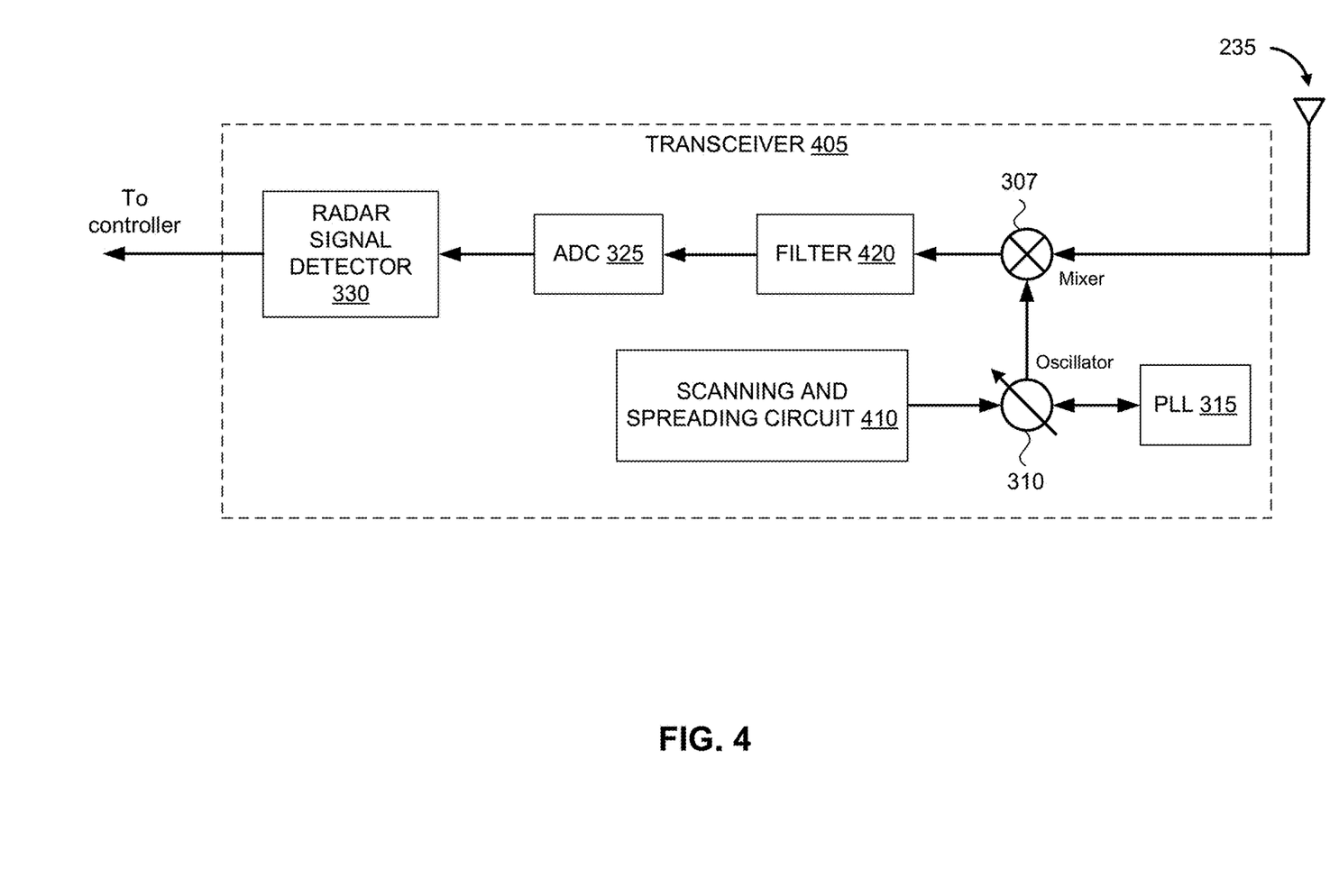
FIG. 4 illustrates a transceiver of the mobile device according to an exemplary aspect of the present disclosure.

FIG. 4 illustrates a transceiver 405 according to an exemplary aspect of the present disclosure. The transceiver 405 can be an exemplary aspect of the transceiver 205 of the mobile device 200. Further, transceiver 405 includes some similar components as those found in transceiver 305. Discussion of these common components may have been omitted for brevity.

In an exemplary aspect, the transceiver 405 includes mixer 307, oscillator 310, PLL 315, ADC 325, and radar signal detector 330 similar to the transceiver 305. The transceiver 405 also includes scanning and spreading circuit 410 and filter 420.

In operation, the output (e.g., baseband) signal from the mixer 307 is provided to filter 420. The filter 420 is configured to filter the received signal to generate a filtered signal and to provide the filtered signal to the ADC 325.

In an exemplary aspect, the filter 420 is a low-pass filter (LPF) but is not limited thereto. In an exemplary aspect, the filter 420 is a narrow band LPF having a cutoff frequency of, for example 10 MHz (but is not limited thereto). For example, the filter 420 can be a narrow band LPF having a cutoff frequency of, for example 5 MHz or another cutoff frequency as would be understood by one of ordinary skill in the relevant arts. In this example, the filter 420 has a narrow bandwidth as compared to the filter 320 of FIG. 3. Further, using the filter 420 with the narrower bandwidth (e.g., 10 MHz vs 80 MHz), the ADC 325 can be configured with a reduced sampling rate as compared with the ADC's 325 operation within the transceiver 305 when implementing the larger bandwidth filter 320. In using the narrower bandwidth filter 420 and operating the ADC 325 with a reduced sampling rate, the mobile device 200 using transceiver 405 can reduce the power consumption of the mobile device 200 as compared with the exemplary aspects implementing the transceiver 305. In an exemplary aspect, the filter 420 includes processor circuitry configured to generate the filtered signal based on the received input signal (e.g., baseband signal). In an exemplary aspect, the filter 420 can include one or more amplifiers that can amplify the received signal prior to or after filtering.

The scanning and spreading circuit 410 can be configured to perform one or more scanning operations to control the oscillator 310 to change the oscillating frequency of the oscillator 310. In an exemplary aspect, scanning and spreading circuit 410 is configured to generate a control signal and to provide the control signal to the oscillator 310 to control the oscillating frequency of the oscillator 310. By changing of the oscillating frequency of the oscillator 310, the scanning and spreading circuit 410 can scan the operating channel of the transceiver 405. For example, by changing the frequency of the oscillator 310, the narrow band (e.g. 10 MHz) of LPF 420 can scan a larger operating channel (e.g., 80 MHz) such as the larger operating channel realized by the 80 MHz LPF 320 of the transceiver 305. The scanning and spreading circuit 410 can additionally or alternatively be configured to perform one or more spread-spectrum operations to spread the received signal (i.e., the signal received via the antenna 235) in the frequency domain. The frequency spread signal will be generating having a wider bandwidth than the bandwidth of the received signal. In an exemplary aspect, the spread-spectrum operations can include frequency spreading the received signal by, for example, 40 MHz, but is not limited thereto. For example, the frequency can be spread by another frequency value as would be understood by one of ordinary skill in the relevant arts. In an exemplary aspect, the scanning and spreading circuit 410 can use a pseudorandom sequence to perform one or more spread-spectrum operations. In an exemplary aspect, the scanning and spreading circuit 410 includes processor circuitry configured to perform the one or more scanning operations and/or the one or more spread-spectrum operations.

In operation, to scan the operating channel, the oscillation frequency $f_{LO}$ of the oscillator 310 is changed by the scanning and spreading circuit 410 (e.g., based on the control signal of the scanning and spreading circuit 410). In an exemplary aspect, the scanning and spreading circuit 410 is configured to change the oscillation frequency $f_{LO}$ of the oscillator 310 to satisfy the following equation:

$$f_{LO} = f_C + \frac{BW_f}{2} - \frac{BW_C}{2} + (k \times BW_f)$$

where $f_C$ is the operating channel center frequency, $BW_C$ is the operating channel bandwidth, $BW_f$ is the narrow band low pass filter bandwidth and $$k = \text{mod}\left(k', \frac{BW_C}{BW_f}\right),$$

where mod is the modulus operator, $$k' \in Z \text{ and } \frac{BW_C}{BW_f} \in Z^+,$$

denotes integer numbers, and Z+ denotes positive integer numbers.

Further, the oscillation frequency $f_{LO}$ remains in the same frequency for a time duration τ, where $$\tau = \frac{T}{\frac{BW_C}{BW_f}},$$

and where T is the operating channel scanning period.

Figure 5:
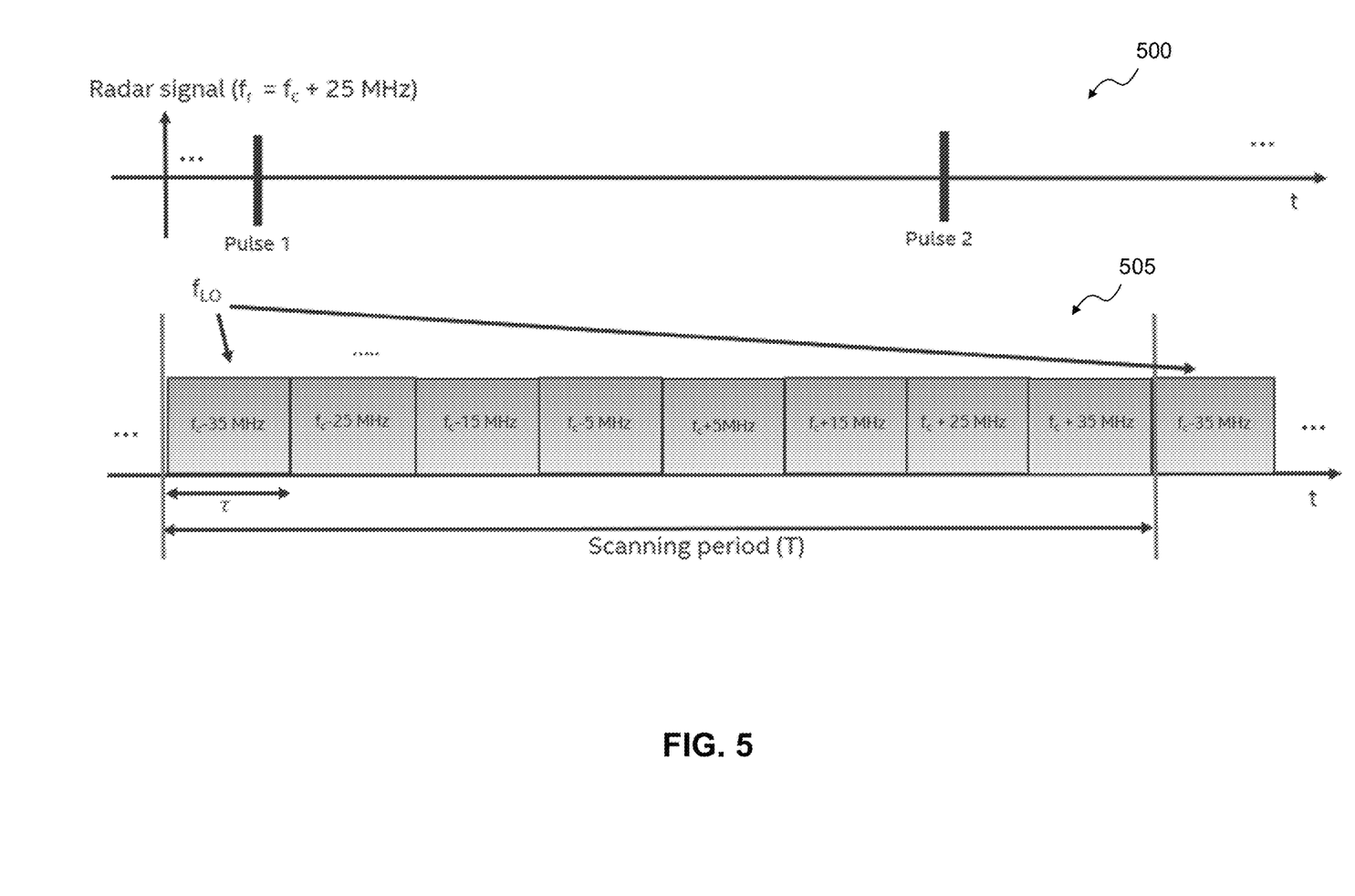
FIG. 5 illustrates an example radar signal and a scanning operation according to an exemplary aspect of the present disclosure.

An example radar signal 500 having a frequency $f_r$ is illustrated in FIG. 5. In this example, the frequency $f_r$ of the radar signal is $f_C$+25 MHz (i.e., $f_r = f_C$+25 MHz). In operation, the narrow band (e.g. 10 MHz) of LPF 420 scans the larger operating channel (e.g., 80 MHz) as referenced by 505. That is, the down-converted radar pulses (e.g., pulses 1 and pulse 2) will be captured (i.e., detected) by the radar signal detector 330 of the transceiver 405 when the frequency spectrum of the down-converted radar pulses are contained in the pass band (e.g., 10 MHz) of LPF 420.

For example, pulse 1 arrives when $f_{LO} = f_C$−35 MHz, where the down-converted radar center frequency of the radar signal is $f_{rd}$=60 MHz. In this example, because UNIT radar signals generally have a frequency spectrum that does not exceed 20 MHz, pulse 1 will be filtered out. However, pulse 2 arrives when the $f_{LO} = f_C$+25 MHz, with $f_{rd}$=0 MHz. Therefore, the energy of pulse 2 would be captured by the LPF 420. In this example, the filtered signal of pulse 2 is then sampled by the ADC 325 at, for example, a sampling rate close the bandwidth of the LPF 420 (e.g., 10 MHz). The digitally converted signal can then be detected by the radar signal detector 330.

Figure 6:
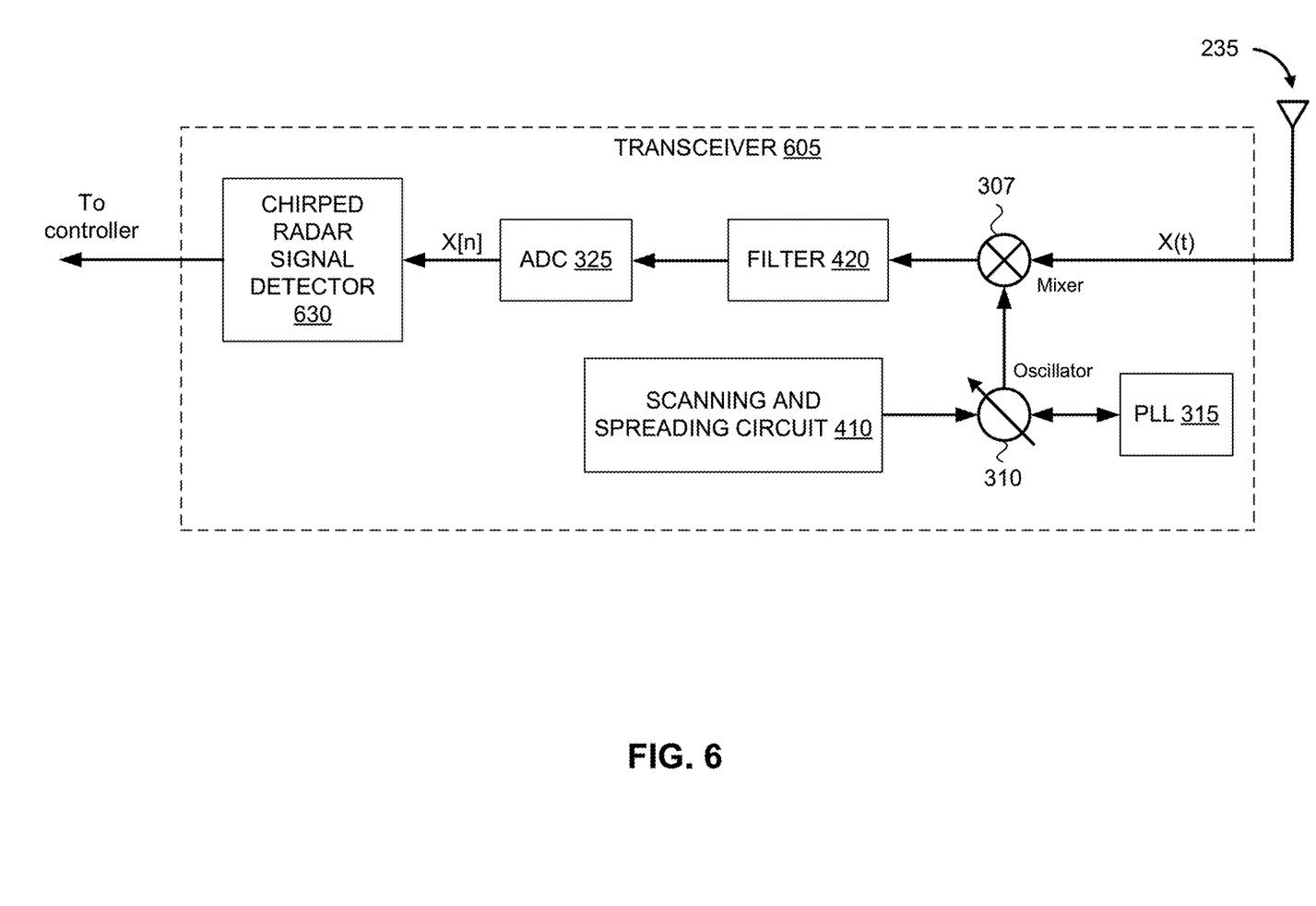
FIG. 6 illustrates a transceiver of the mobile device according to an exemplary aspect of the present disclosure.

FIG. 6 illustrates a transceiver 605 according to an exemplary aspect of the present disclosure. The transceiver 605 can be an exemplary aspect of the transceiver 205 of the mobile device 200. Further, transceiver 605 includes some similar components as those found in transceivers 305 and/or 405. Discussion of these common components may have been omitted for brevity.

In an exemplary aspect, the transceiver 605 includes mixer 307, oscillator 310, PLL 315, ADC 325, filter 420 and scanning and spreading circuit 410 as similarly described with reference to FIGS. 3 and 4. The transceiver 605 also includes a radar signal detector 630. In an exemplary aspect, the scanning and spreading circuit 410 is configured to perform one or more scanning operations to control the oscillator 310 to change the oscillating frequency of the oscillator 310. In this example, the scanning and spreading circuit 410 does not perform one or more spread-spectrum operations to spread the received signal as described above with reference to transceiver 405.

The mixer 307 can be configured to receive one or more radio frequency (RF) signals X(t) via the antenna 235, and to modulate (e.g., down convert) the RF signal(s) X(t) based on and one or more oscillating signals from the oscillator 310 to generate one or more corresponding baseband signals.

In operation, the baseband signal output from the mixer 307 is provided to filter 420. The filter 420 is configured to filter the baseband signal to generate a filtered signal and to provide the filtered signal to the ADC 325. In an exemplary aspect, the filter 420 is a low-pass filter (LPF) but is not limited thereto. In an exemplary aspect, the filter 420 is a LPF having a cutoff frequency of, for example 10 MHz (but is not limited thereto) that is configured to pass signals having a frequency lower than the cutoff frequency (e.g., 10 MHz).

The ADC 325 is configured to receive one or more signals and to generate one or more corresponding digital output signals based on the received signal(s). For example, the ADC 325 can be configured to receive an analog signal and to convert the analog signal to a digital signal. In operation, the ADC 325 can receive one or more analog signals (e.g., filtered signal) from the filter 420 and to generate one or more corresponding digital signals X[n]. In an exemplary aspect, the ADC 325 can be configured with a reduced sampling rate as described above with reference to FIG. 4. In using the narrower bandwidth filter 420 and operating the ADC 325 with a reduced sampling rate, the mobile device 200 using transceiver 605 can reduce the power consumption of the mobile device 200 as compared with the exemplary aspects implementing the transceiver 305. The ADC 325 can provide the digital signal(s) X[n] to the radar signal detector 630. In an exemplary aspect, the signal(s) X[n] satisfy the following equation (1):

$$x[n] = A\sin(f(n))rect\left(\frac{n-S/2}{S}\right) = A\sin\left(\varphi_0 + 2\pi\left(f_0 n + \frac{K}{2}n^2\right)\right)rect\left(\frac{n-S/2}{S}\right) \quad (1)$$

where A is a scaling constant, φ0 is the initial phase (at n=0), $f_0$ is the starting frequency, $f_1$ is the final frequency, $K=(f_1-f_0)/S$, and S is the chirp sweeping time.

The radar signal detector 630 is configured to detect one or more radar signals based on corresponding input signals and to provide an the radar signal(s) and/or an indication of the presence of the radar signal(s) to the controller 240.

In an exemplary aspect, the radar signal detector 630 is a chirped radar signal detector 630 configured to perform one or more envelope detection operations and/or one or more thresholding operations. In an exemplary aspect, the chirped radar signal detector 630 is configured to use the properties of linearly modulated chirped signals to detect long pulse radar test waveforms. In an exemplary aspect, the chirped radar signal detector 630 is additionally configured to detect short pulse radar test waveforms and can include similar components (see FIG. 3B) and perform similar processing as the radar signal detector 330. In this example, the chirped radar signal detector 630 includes processor circuitry configured to detect long pulse radar test waveforms and short pulse radar test waveforms. Further, when the chirped radar signal detector 630 is configured to also detect short pulse radar test waveforms, the scanning and spreading circuit 410 can be configured to perform one or more scanning operations and one or more spread-spectrum operations, while performing only one or more scanning operations when detecting long pulse radar test waveforms. An exemplary aspect of the chirped radar signal detector 630 is described in detail below with reference to FIG. 7.

The envelope detection operation(s) can detect an envelope of an input signal. In an exemplary aspect, an envelope detection operation can include integrating a received input signal (e.g., digital signal from ADC 325). For example, the radar signal detector 630 can be configured to integrate the input signal (e.g., digital signal from ADC 325) of the radar signal detector 630 to perform the envelope detection operation. In an exemplary aspect, the radar signal detector 630 can be configured to filter the input signal of the radar signal detector 630 to perform the envelope detection operation.

In an exemplary aspect, the thresholding operations include comparing the signal (e.g., the enveloped detected signal) to a threshold value and generating an output signal based on the comparison. For example, the radar signal detector 330 can be configured to compare the envelope detected signal to a threshold value, and to generate an output signal that represents when the envelope detected signal is above or below the threshold value. In an exemplary aspect, the radar signal detector 320 includes processor circuitry configured to perform one or more envelope detection operations and/or one or more thresholding operations.

In an exemplary aspect, the chirped radar signal detector 630 is configured to detect the long pulse radar test waveforms using the properties of linearly modulated chirped signals. For example, the chirped radar signal detector 630 can be configured to detect long pulse radar test waveforms based the pulse width (PW), the number of pulses, and/or pulse repetition interval (PRI). In an exemplary aspect, the chirped radar signal detector 630 is configured to measure the duration of the pulse width (PW) (e.g., duration between 50-100 μs). In this example, the radar signal detector 630 can determine if the waveform is a long pulse or short pulse radar test waveform. If the measured (or estimated) PW is within a threshold range (e.g., duration between 50-100 μs), the chirped radar signal detector 630 can be configured to detect consecutive pulses with the same PRI and/or PW. Based on the detection of consecutive pulses with the same PRI and/or PW, the chirped radar signal detector 630 can detect the presence of a long pulse radar test waveform. For example, if consecutive pulses have the same PRI and PW, the chirped radar signal detector 630 can determine that a radar signal is present. At this point, the mobile device 200 having transceiver 605 can be configured to avoid using one or more frequencies or frequency bands within UNIT frequency bands. In an exemplary aspect, the chirped radar signal detector 630 is additionally configured to detect short pulse radar test waveforms as discussed above with reference to the radar signal detector 330. In this example, the chirped radar signal detector 630 can include similar components as the radar signal detector 330 illustrated in FIG. 3B. Further, when the chirped radar signal detector 630 is also configured to also detect short pulse radar test waveforms, the scanning and spreading circuit 410 can be configured to perform one or more scanning operations and one or more spread-spectrum operations, while performing only one or more scanning operations when detecting long pulse radar test waveforms.

Figure 7:
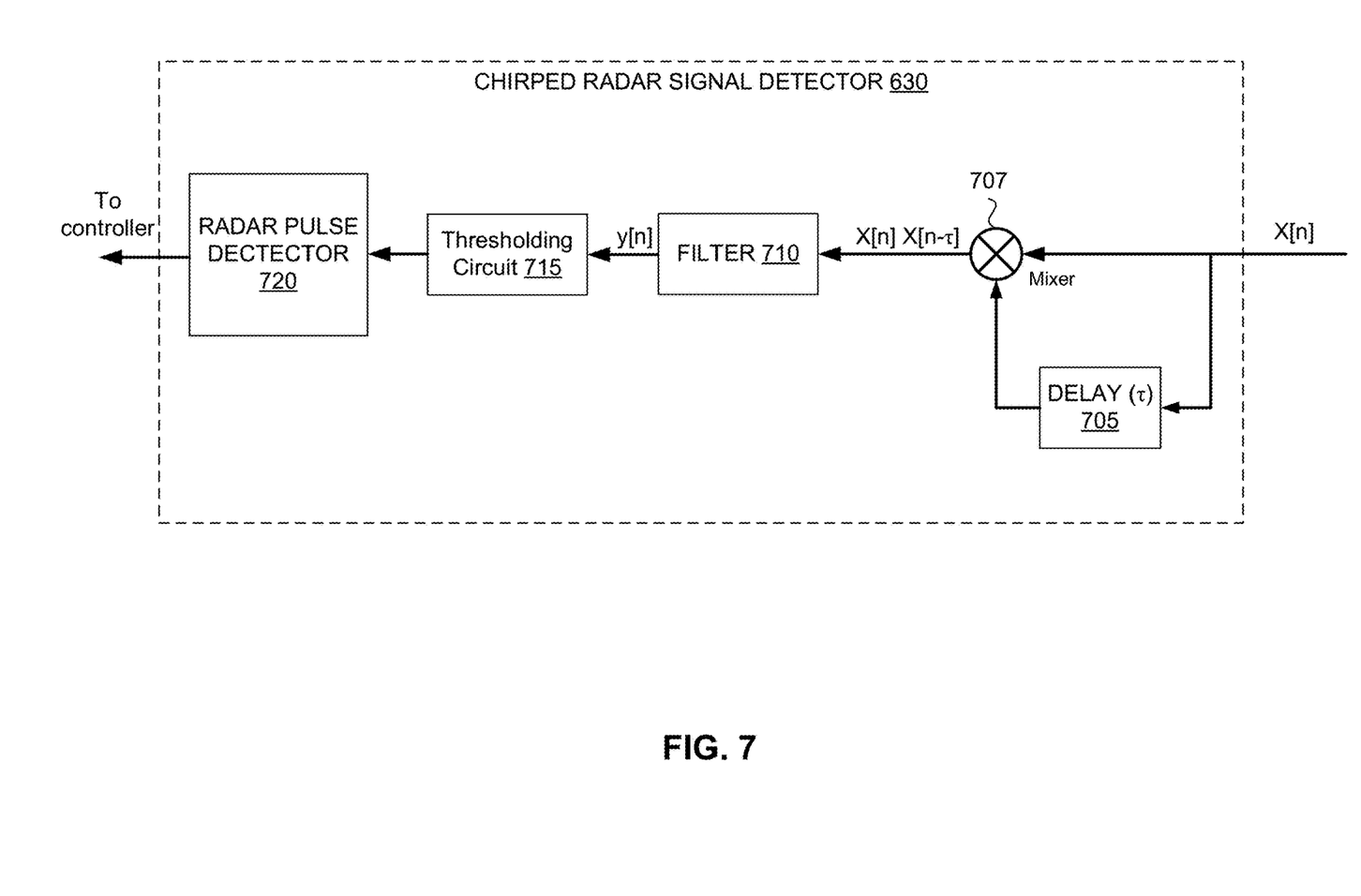
FIG. 7 illustrates a radar signal detector according to an exemplary aspect of the present disclosure.

As illustrated in FIG. 7, in an exemplary aspect, the chirped radar signal detector 630 includes a delay circuit 705, mixer 707, filter 710, thresholding circuit 715, and radar pulse detector circuit 720.

The delay circuit 705 is configured to receive one or more digital signals X[n] from the ADC 325 and to delay the digital signal(s) X[n] by a delay value τ to generate corresponding delayed signal(s) X[n−τ]. The delay value τ can be, for example 0.125 μs, but is not limited thereto. The delay circuit 705 can then provide the delayed signal(s)

X[n−τ] to the mixer 707. In an exemplary aspect, the delay circuit 705 includes processor circuitry configured to delay one or more received signals to generate a delay signal.

The mixer 707 can be configured to receive one or more digital signals X[n] from the ADC 325 and corresponding delayed signal(s) X[n−τ] from the delay circuit 705, and to generate a composite signal based on the digital signal(s) X[n] and the delayed signal(s) X[n−τ]. In an exemplary aspect, the mixer 707 is a multiplicative mixer configured to multiple the digital signal(s) X[n] and the delayed signal(s) X[n−τ] together to generate a composite signal X[n] X[n−τ]. The mixer 707 is not limited to a multiplicative mixer and can be another type of mixer such as an additive mixer in another aspect. The mixer 707 can be configured to provide the composite signal X[n] X[n−τ] to the filter 710. In an exemplary aspect, the mixer 707 includes processor circuitry configured to perform the operations of the mixer, including mixing two or more input signals to generate a composite output signal.

In an exemplary aspect, the composite signal X[n] X[n−τ] satisfies the following equation (2):

The filter 710 is configured to filter a received input signal to generate a filtered output signal. For example, the filter 710 can be configured to receive the composite signal X[n] X[n−τ] from the mixer 707 and to filter the composite signal to generate a filtered signal y[n].

In an exemplary aspect, as described above with reference to Equation 2, the composite signal X[n] X[n−τ] is equal to (y[n]+y'[n])rect $$\left(\frac{n - \frac{S+\tau}{2}}{S-\tau}\right).$$

After filtering by the filter 710, the filtered output signal y[n] is generated as described above and with reference to Equation 3.

In an exemplary aspect, the filter 710 is a low-pass filter (LPF) but is not limited thereto. In an exemplary aspect, the filter 710 is a LPF having a cutoff frequency of, for example 1 MHz (but is not limited thereto). In an exemplary aspect, $$X[n]X[n-\tau] = A^2 \sin(f(n))\sin(f(n-\tau))rect\left(\frac{n - \frac{S+\tau}{2}}{S-\tau}\right) \quad (2)$$

$$= \frac{A^2}{2}[\cos(f(n) - f(n-\tau)) - \cos(f(n) + f(n-\tau))]rect\left(\frac{n - \frac{S+\tau}{2}}{S-\tau}\right)$$

$$= (y[n] + y'[n])rect\left(\frac{n - \frac{S+\tau}{2}}{S-\tau}\right)$$

where A is the scaling constant, y(n) and y'(n) represent a low frequency sinusoidal signal (i.e., the output of the filter 710 in FIG. 7) and a high frequency chirped signal, respectively.

The low frequency sinusoidal signal y(n) satisfies the following equation (3):

$$y[n] = \frac{A^2}{2}\cos(f(n) - f(n-\tau)) =$$

$$\frac{A^2}{2}\cos\left[2\pi\left(f_0\tau - \frac{K\tau^2}{2} + K\tau n\right)\right] = \frac{A^2}{2}\cos(\varphi_1 + 2\pi K\tau n)$$

where A is the scaling constant, φ0 is the initial phase $$(\text{at } n = 0), \varphi_1 = 2\pi\left(f_0\tau - \frac{K\tau^2}{2}\right), f_0$$

is the starting frequency, $f_1$ is the final frequency, $K=(f_1-f_0)/S$, S is the chirp sweeping time, and π is pi.

The high frequency chirped signal y'(n) satisfies the following equation (4):

$$y'[n] = \frac{A^2}{2}\cos(f(n) + f(n-\tau)) =$$

$$\frac{A^2}{2}\cos\left[2\varphi_0 + 2\pi\left(2f_0n - f_0\tau + Kn^2 + \frac{K\tau^2}{2} - K\tau n\right)\right]$$

where A is the scaling constant, φ0 is the initial phase (at n=0), $f_0$ is the starting frequency, $f_1$ is the final frequency, $K=(f_1-f_0)/S$, S is the chirp sweeping time, and π is pi.

the filter 710 is configured to function as an envelope detector and to perform envelope detection operations of the chirped radar signal detector 630. In an exemplary aspect, the filter 710 includes processor circuitry configured to generate the filtered signal y[n] based on the received input signal (e.g., X[n] X[n−τ]).

The thresholding circuit 715 is configured to perform one or more thresholding operations. In an exemplary aspect, the thresholding circuit 715 is configured to compare a received signal (e.g., the filtered signal y[n]) to a threshold value, and to generate an output signal based on the comparison. For example, thresholding circuit 715 can be configured to compare the envelope detected signal (filtered signal y[n]) to a threshold value, and to generate an output signal that represents when the envelope detected signal is above or below the threshold value. In an exemplary aspect, the thresholding circuit 715 includes processor circuitry configured to perform one or more thresholding operations.

The radar pulse detector 720 can be configured to detect one or more signal pulses. In an exemplary aspect, the radar pulse detector 720 can be configured to detect one or more pulses based on the output signal of the thresholding circuit 715. For example, the radar pulse detector can be configured to process the portions of the envelope detected signal that are above or below the threshold value to detect the presence of one or more signal pulses. The radar pulse detector 720 can also be configured to detect the width of the detected one or more signal pulses. The radar pulse detector 720 can be configured to generate an output signal corresponding to the detected signal pulses and/or signal pulse widths, and to provide the output signal to the controller 240. Based on the output signal, the controller 240 can determine the presence of a radar signal and can control the mobile device 200 to avoid using one or more frequencies or frequency bands within UNIT frequency bands.

In exemplary aspects described herein, using the narrower bandwidth filter (e.g., filter 420) and operating the ADC with a reduced sampling rate while performing one or more scanning operations, the power consumption of the mobile device 200 can be reduced. Further, employing one or more spread-spectrum operations, the probability of detecting radar signals is increased even while using the narrower bandwidth operating channel.

Examples

Example 1 is a communication device, comprising: a mixer configured to modulate a radio frequency (RF) signal based on an oscillating signal to generate an output signal; a filter configured to filter the modulated signal; a scanning and spreading circuit configured to control the oscillating signal to scan an operating channel; and a radar signal detector configured to detect a radar signal based on the scanned operating channel.

In Example 2, the subject matter of Example 1, wherein the filter is further configured to operate in a bandwidth that is smaller than an operating channel bandwidth of the operating channel.

In Example 3, the subject matter of Example 1, wherein the scanning and spreading circuit is further configured to perform a spread-spectrum processing on the received communication signal to spread the received communication signal in a frequency domain.

In Example 4, the subject matter of Example 1, wherein the scanning and spreading circuit is configured to adjust an oscillation frequency of the oscillating signal to scan the operating channel.

In Example 5, the subject matter of Example 1, further comprising an oscillator configured to generate the oscillating signal, wherein the oscillating signal has an oscillation frequency.

In Example 6, the subject matter of Example 5, wherein the scanning and spreading circuit is configured to adjust the oscillation frequency of the oscillating signal to scan the operating channel.

In Example 7, the subject matter of Example 1, wherein the radar signal has a frequency within the Unlicensed National Information Infrastructure (UNIT) frequency bands.

In Example 8, the subject matter of Example 1, wherein the radar signal detector comprises: a delay circuit configured to delay the modulated signal to generate a delayed signal; a mixer configured to generate a composite signal based on the modulated signal and the delayed signal; a filter configured to filter the composite signal to generate a filtered signal; and a radar pulse detector configured to detect the radar signal based on the filtered signal.

Example 9 is a communication device, comprising: a mixer configured to modulate a received communication signal based on an oscillating signal to generate an output signal; a filter having a first bandwidth and configured to filter the output signal; a scanning and spreading circuit configured to: control the oscillating signal to scan an operating channel having a second bandwidth that is greater than the first bandwidth; and perform a spread-spectrum processing on the received communication signal to spread the received communication signal in a frequency domain; and a radar signal detector configured to detect a radar signal pulse in the received communication signal based on the scanning of the operating channel.

In Example 10, the subject matter of Example 9, wherein the scanning and spreading circuit is configured to adjust an oscillation frequency of the oscillating signal to scan the operating channel.

In Example 11, the subject matter of Example 9, further comprising an oscillator configured to generate the oscillating signal, wherein the oscillating signal has an oscillation frequency.

In Example 12, the subject matter of Example 11, wherein the scanning and spreading circuit is configured to adjust the oscillation frequency of the oscillating signal to scan the operating channel.

In Example 13, the subject matter of Example 9, wherein the radar signal pulse is associated with a radar signal having a frequency within the Unlicensed National Information Infrastructure (UNIT) frequency bands.

In Example 14, the subject matter of Example 9, wherein the radar signal detector comprises: a delay circuit configured to delay the modulated signal to generate a delayed signal; a mixer configured to generate a composite signal based on the modulated signal and the delayed signal; a filter configured to filter the composite signal to generate a filtered signal; and a radar pulse detector configured to detect the radar signal pulse based on the filtered signal.

In Example 15, the subject matter of Example 14, wherein the radar signal detector further comprises a thresholding circuit configured to: compare the filtered signal to a threshold value; and generate a threshold signal based on the comparison, wherein the radar pulse detector is configured to detect the radar signal pulse based on the threshold signal.

Example 16 is a communication device adapted to communicate via a communication protocol, comprising: a controller configured to control the communication device to disable communication via the communication protocol based on a radar detection signal; and a transceiver configured to communicate via the communication protocol, detect a radar signal pulse within a received communication signal, and generate the radar detection signal based on the detection of the radar signal pulse, wherein the transceiver includes: a filter having a first bandwidth and configured to filter the received communication signal to generate a filtered signal; a scanning and spreading circuit configured to: scan an operating channel having a second bandwidth that is greater than the first bandwidth; and spread the received communication signal in a frequency domain; and a radar signal detector configured to detect the radar signal pulse within the filtered signal based on the scanning of the operating channel and to generate the radar detection signal based on the detection of the radar signal pulse.

In Example 17, the subject matter of Example 16, wherein the transceiver further comprises a mixer configured to modulate the received communication signal based on an oscillating signal to generate a modulated signal, wherein the filter is configured to filter the modulated signal to generate the filtered signal.

In Example 18, the subject matter of Example 16, wherein the radar signal pulse is associated with a radar signal having a frequency within the Unlicensed National Information Infrastructure (UNIT) frequency bands.

In Example 19, the subject matter of Example 18, wherein the communication protocol operates on a frequency or a frequency band within the UNIT frequency bands.

In Example 20, the subject matter of Example 16, wherein the radar signal detector comprises: a delay circuit configured to configured to delay the filtered signal to generate a delayed signal; a mixer configured to generate a composite signal based on the filtered signal and the delayed signal; a second filter configured to filter the composite signal to generate a second filtered signal; and a radar pulse detector configured to detect the radar signal pulse based on the second filtered signal.

Example 21 is a communication device, comprising: mixing means for modulating a radio frequency (RF) signal based on an oscillating signal to generate an output signal; filtering means for filtering the modulated signal; scanning and spreading means for controlling the oscillating signal to scan an operating channel; and radar signal detecting means for detecting a radar signal based on the scanned operating channel.

In Example 22, the subject matter of Example 21, wherein the filter means operates in a bandwidth that is smaller than an operating channel bandwidth of the operating channel.

In Example 23, the subject matter of any of Examples 21-22, wherein the scanning and spreading means performs a spread-spectrum processing on the received communication signal to spread the received communication signal in a frequency domain.

In Example 24, the subject matter of any of Examples 21-23, wherein the scanning and spreading means adjusts an oscillation frequency of the oscillating signal to scan the operating channel.

In Example 25, the subject matter of any of Examples 21-24, further comprising oscillating means for generating the oscillating signal, wherein the oscillating signal has an oscillation frequency.

In Example 26, the subject matter of Example 25, wherein the scanning and spreading means adjusts the oscillation frequency of the oscillating signal to scan the operating channel.

In Example 27, the subject matter of any of Examples 21-26, wherein the radar signal has a frequency within the Unlicensed National Information Infrastructure (UNIT) frequency bands.

In Example 28, the subject matter of any of Examples 21-27, wherein the radar signal detecting means comprises: delay means for delaying the modulated signal to generate a delayed signal; mixing means for generating a composite signal based on the modulated signal and the delayed signal; filtering means for filtering the composite signal to generate a filtered signal; and radar pulse detecting means for detecting the radar signal based on the filtered signal.

Example 29 is an apparatus substantially as shown and described.

Example 30 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to UNIT communications and can be applied to other cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A communication device, comprising:
  a first mixer configured to modulate a received communication signal based on a controlled oscillating signal to generate an output signal;
  a first filter configured to filter the output signal to generate a filtered signal;
  an analog to digital converter (ADC) configured to convert the filtered signal to a digital signal;
  a scanning and spreading circuit configured to
    scan a single operating channel having an operating channel bandwidth and an operating channel center frequency associated therewith, across the operating channel bandwidth by providing the controlled oscillating signal to the first mixer based on changing an oscillation frequency of an oscillating signal at predefined time intervals during a scanning period of the single operating channel, wherein the predefined time intervals are derived based on a bandwidth of the first filter and the operating channel bandwidth; and
  a radar signal detector configured to detect a radar signal in the received communication signal based on the digital signal.

2. The communication device of claim 1, wherein the operating channel bandwidth is greater than the bandwidth of the first filter.

3. The communication device of claim 1, further comprising an oscillator configured to generate the oscillating signal.

4. The communication device of claim 1, wherein the radar signal has a frequency within Unlicensed National Information Infrastructure (UNII) frequency bands.

5. The communication device of claim 1, wherein the radar signal detector comprises:
  a delay circuit configured to delay the digital signal to generate a delayed signal;
  a second mixer configured to generate a composite signal based on the digital signal and the delayed signal;
  a second filter configured to filter the composite signal to generate a filtered output signal; and
  a radar pulse detector configured to detect the radar signal based on the filtered output signal.

6. The communication device of claim 1, wherein the radar signal detector is configured to detect the radar signal in the received communication signal based on at least one of a pulse width (PW), number of pulses and a pulse repetition interval (PRI) associated with the digital signal or a signal derived therefrom, and a corresponding threshold.

7. The communication device of claim 1, wherein the controlled oscillating signal has a frequency that is derived in accordance with the operating channel center frequency and the bandwidth of the first filter during all the predefined time intervals.

8. A communication device, comprising:
  a first mixer configured to modulate a received communication signal based on a controlled oscillating signal to generate an output signal;
  a first filter having a first bandwidth and configured to filter the output signal to generate a filtered signal;
  an analog to digital converter (ADC) configured to convert the filtered signal to a digital signal;
  a scanning and spreading circuit configured to scan a single operating channel having an operating channel bandwidth and an operating channel center frequency associated therewith, across the operating channel bandwidth, by providing the controlled oscillating signal to the first mixer based on changing an oscillation frequency of an oscillating signal at predefined time intervals during a scanning period of the single operating channel, wherein the predefined time intervals are derived based on the first bandwidth of the first filter and the operating channel bandwidth; and
  a radar signal detector configured to detect a radar signal pulse in the received communication signal based on at least one of a pulse width (PW), number of pulses and a pulse repetition interval (PRI) associated with the digital signal or a signal derived therefrom, and a corresponding threshold.

9. The communication device of claim 8, wherein the operating channel bandwidth is greater than the first bandwidth.

10. The communication device of claim 8, wherein the radar signal pulse is associated with a radar signal having a frequency within Unlicensed National Information Infrastructure (UNII) frequency bands.

11. The communication device of claim 8, wherein the radar signal detector comprises:
  a delay circuit configured to delay the digital signal to generate a delayed signal;
  a second mixer configured to generate a composite signal based on the digital signal and the delayed signal;
  a second filter configured to filter the composite signal to generate a filtered output signal; and
  a radar pulse detector configured to detect the radar signal pulse based on the filtered output signal.

12. The communication device of claim 8, wherein the controlled oscillating signal has a frequency that is derived in accordance with the operating channel center frequency and the first bandwidth of the first filter during all the predefined time intervals.

13. A communication device adapted to communicate via a communication protocol, comprising:
  a controller configured to control the communication device to disable communication via the communication protocol based on a radar detection signal; and
  a transceiver configured to communicate via the communication protocol, detect a radar signal pulse within a received communication signal, and generate the radar detection signal based on the detection of the radar signal pulse, wherein the transceiver includes a first mixer configured to modulate the received communication signal based on a controlled oscillating signal to generate an output signal, a first filter having a first bandwidth and configured to filter the output signal to generate a filtered signal;

an analog to digital converter (ADC) configured to convert the filtered signal to a digital signal;

a scanning and spreading circuit configured to
scan a single operating channel having an operating channel bandwidth and an operating channel center frequency associated therewith, across the operating channel bandwidth, by providing the controlled oscillating signal to the first mixer based on changing an oscillation frequency of an oscillating signal at predefined time intervals during a scanning period of the single operating channel, wherein the predefined time intervals are derived based on the first bandwidth of the first filter and the operating channel bandwidth; and a radar signal detector configured to
detect the radar signal pulse within the received communication signal based on at least one of a pulse width (PW), number of pulses and a pulse repetition interval (PRI) associated with the digital signal or a signal derived therefrom, and a corresponding threshold, and
generate the radar detection signal based on the detection of the radar signal pulse.

14. The communication device of claim 13, wherein the radar signal pulse is associated with a radar signal having a frequency within Unlicensed National Information Infrastructure (UNII) frequency bands.

15. The communication device of claim 14, wherein the communication protocol operates on a frequency or a frequency band within the UNII frequency bands.

16. The communication device of claim 13, wherein the radar signal detector comprises:
a delay circuit configured to configured to delay the digital signal to generate a delayed signal;
a second mixer configured to generate a composite signal based on the digital signal and the delayed signal;
a second filter configured to filter the composite signal to generate a second filtered signal; and
a radar pulse detector configured to detect the radar signal pulse based on the second filtered signal.

17. The communication device of claim 13, wherein the controlled oscillating signal has a frequency that is derived in accordance with the operating channel center frequency and the first bandwidth of the first filter during all the predefined time intervals.

* * * * *